A. E. BUCHENBERG.
ELECTRIC WELDING APPARATUS.
APPLICATION FILED OCT. 6, 1910.
1,019,299.
Patented Mar. 5, 1912.
6 SHEETS—SHEET 4.
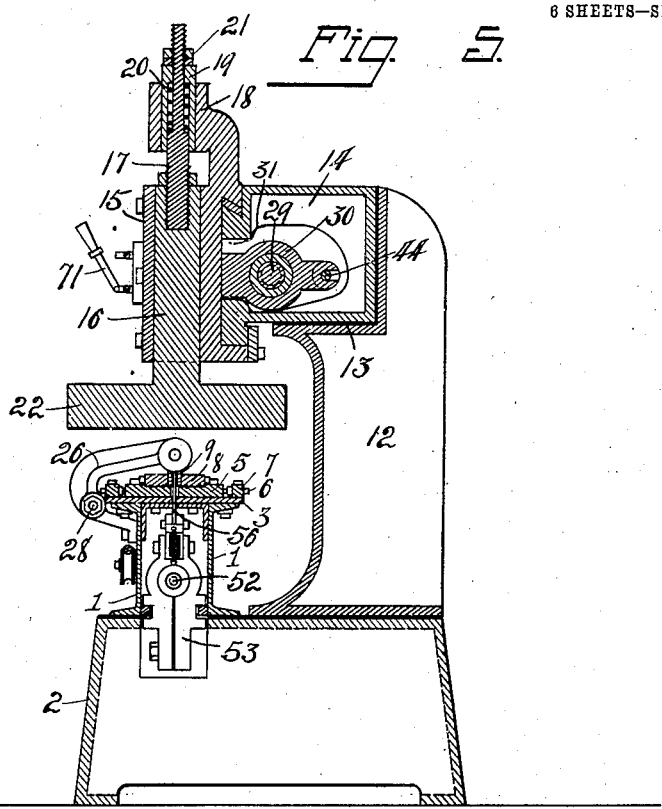
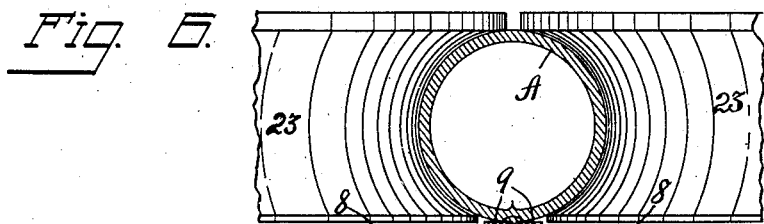
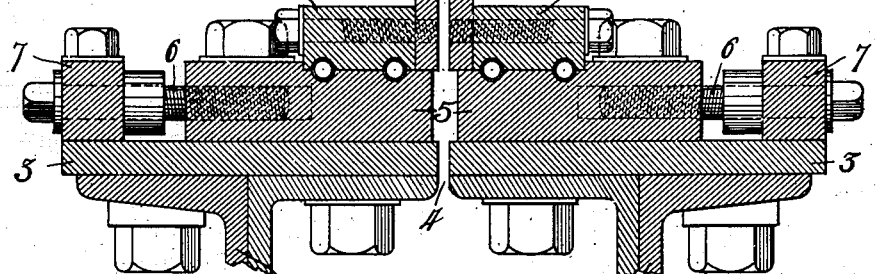

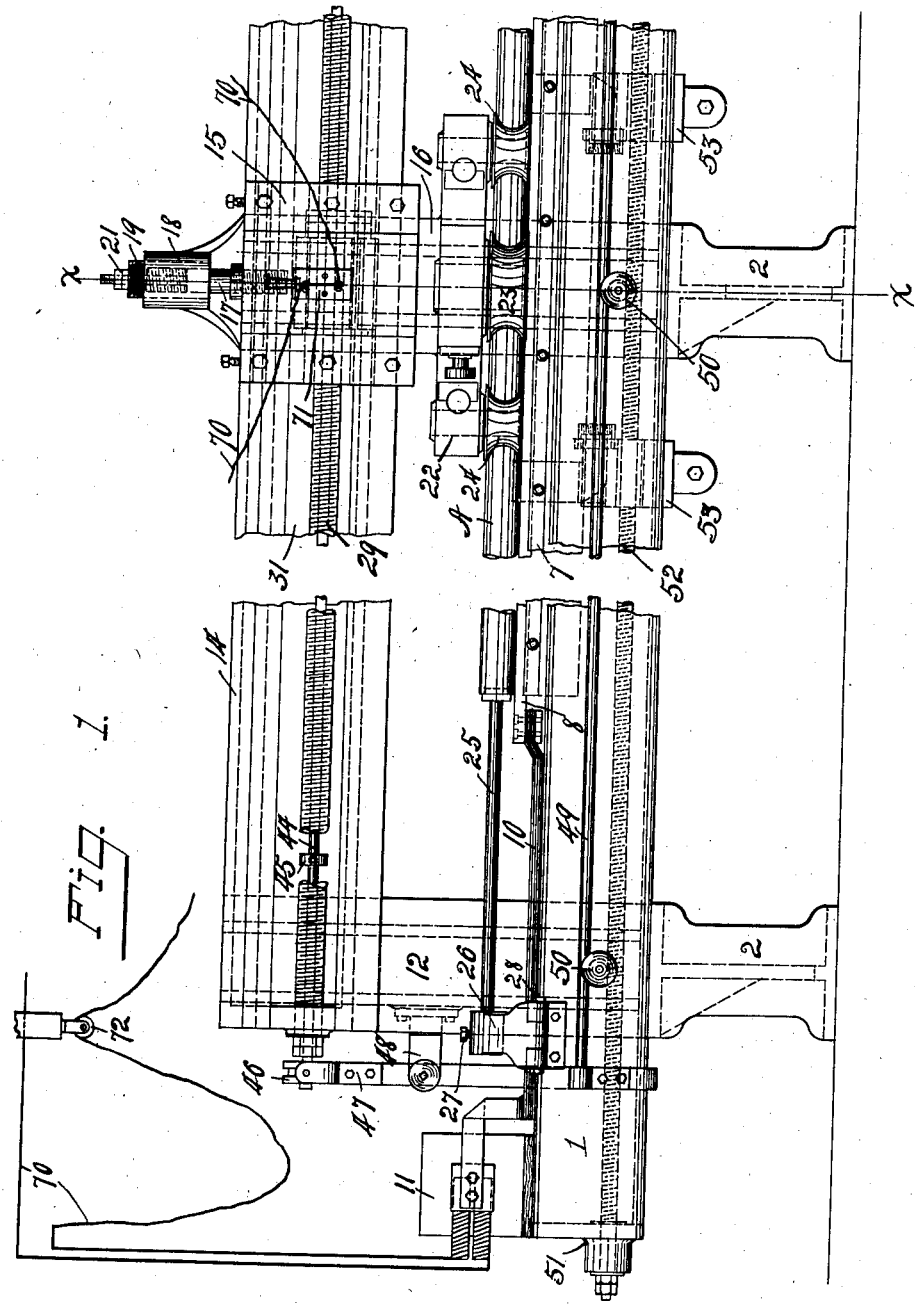

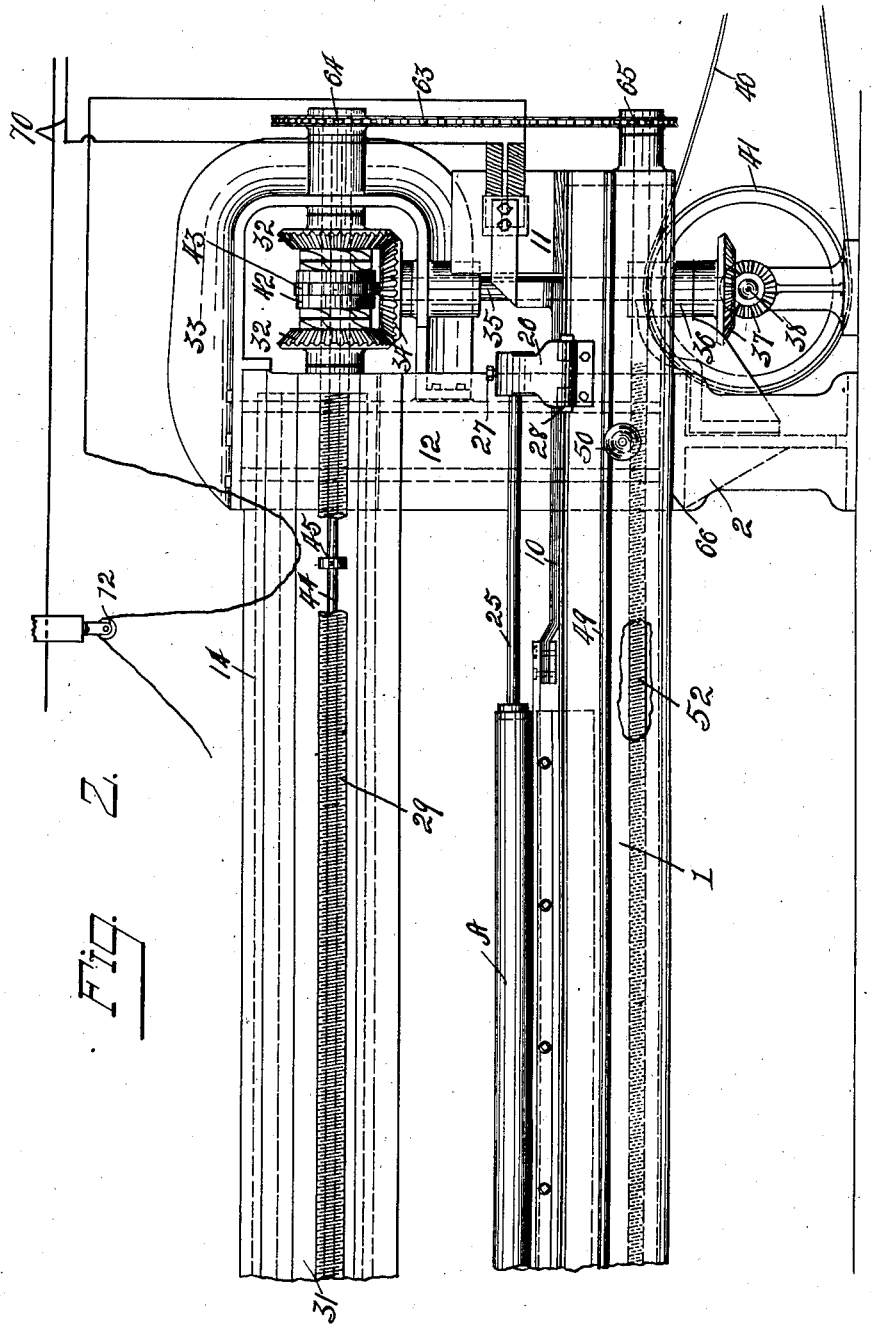

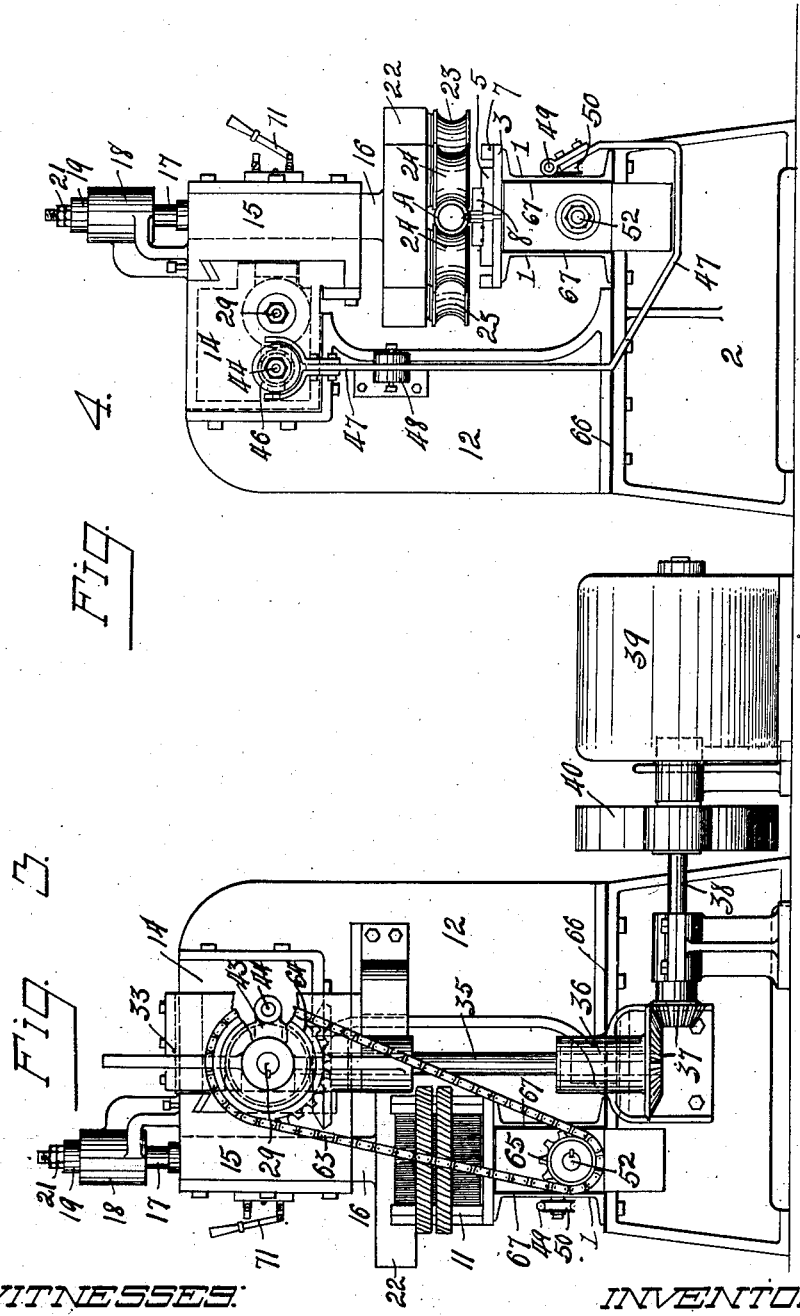

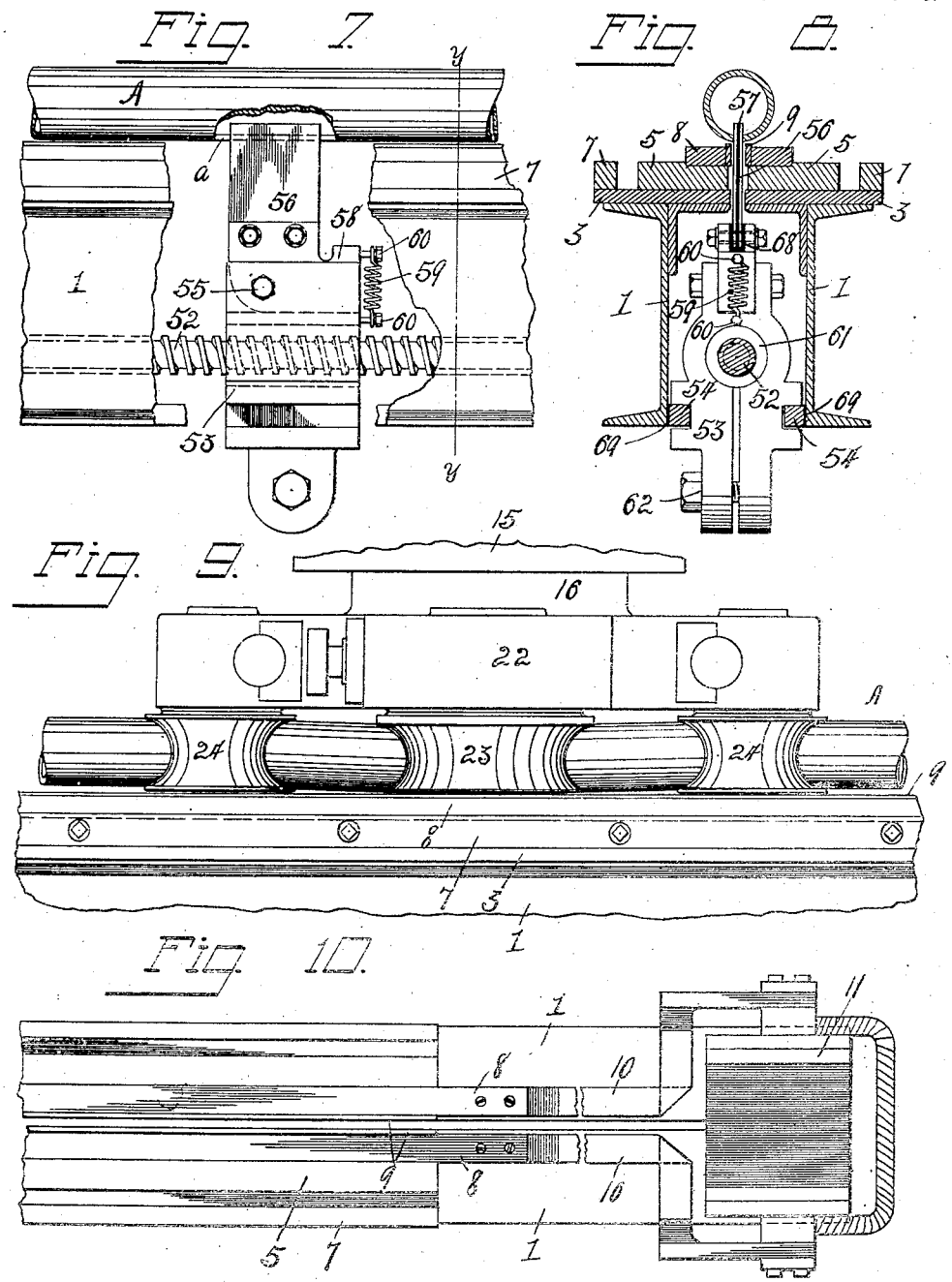

A. E. BUCHENBERG.
ELECTRIC WELDING APPARATUS.
APPLICATION FILED OCT. 6, 1910.
1,019,299.
Patented Mar. 5, 1912.
6 SHEETS—SHEET 6.
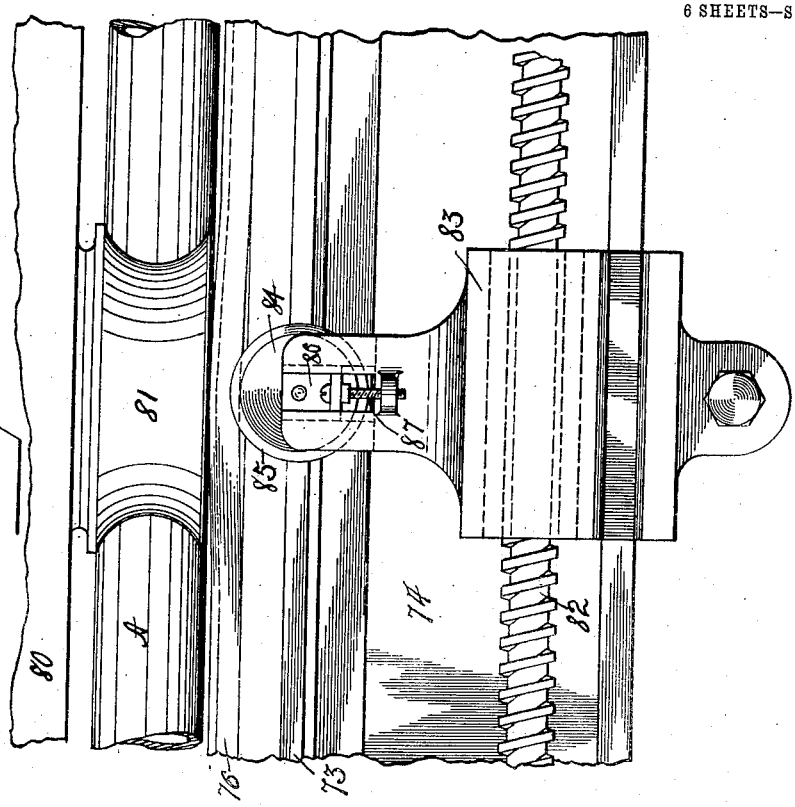
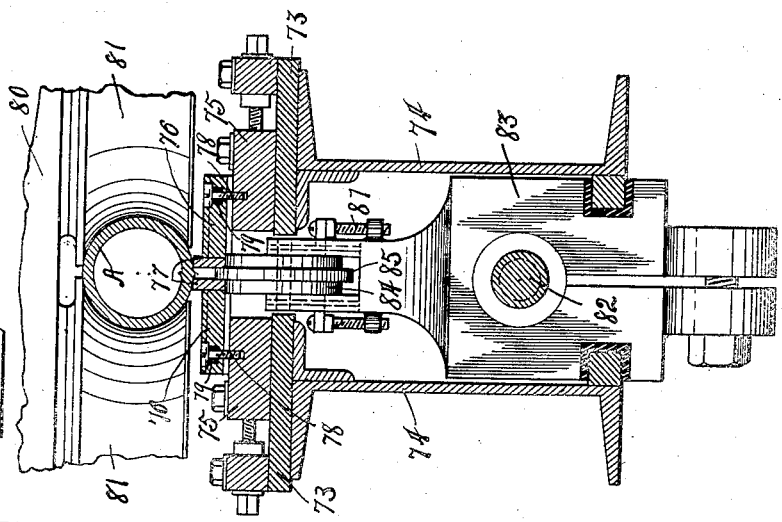
WITNESSES:
C. H. Bills.
M. G. Gaskell.
INVENTOR.
Alvin E. Buchenberg,
By Owen & Owen,
His attys.

UNITED STATES PATENT OFFICE.

ALVIN E. BUCHENBERG, OF TOLEDO, OHIO.

ELECTRIC WELDING APPARATUS.

1,019,299.  Specification of Letters Patent.  Patented Mar. 5, 1912.

Application filed October 6, 1910. Serial No. 585,670.

*To all whom it may concern:*

Be it known that I, ALVIN E. BUCHENBERG, a citizen of the United States, and a resident of Toledo, in the county of Lucas and State of Ohio, have invented a certain new and useful Electric Welding Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to apparatus for welding or performing similar operations by passing heavy electric currents through the work for the purpose of raising the same to the desired welding temperature, and while it is designed more particularly for use in electric welding of tubes, cylinders or other forms of work which are formed from sheet metal into the desired cross-sectional shape and welded along the seam, it is not restricted to such use as it may be used in any connection for which it may be adapted or appropriate.

The object of my invention is the provision of a simple and easily operated machine of this character, which is adapted to progressively seam weld tubular or other forms of long work in a more rapid, efficient and economical manner than has heretofore been possible, whereby to enhance the practicability and commercial value of apparatus of this class.

A further object of my invention is the provision in combination with a set of bar or elongated welding dies capable of welding contact with work throughout their lengths, of at least two transformers connected in parallel to opposite ends thereof whereby to equalize the current throughout the lengths of such bars or dies.

Further objects of the invention, as well as the operation, construction and arrangement of the parts thereof, are fully described in the following specification, and while the invention, in its broader aspect, is capable of embodiment in numerous forms a preferred and one modified form thereof are illustrated in the accompanying drawings, in which,—

Figure 1 is a front elevation of the left end portion of a machine embodying the invention with parts broken away. Fig. 2 is a similar view of the right end portion thereof with parts broken away. Fig. 3 is a right end elevation thereof with a part broken away. Fig. 4 is a left end elevation thereof with parts removed to show the end of a tube being acted on. Fig. 5 is a transverse section of the machine on the line $x$ $x$ in Fig. 1, with the tube compressing rolls removed. Fig. 6 is an enlarged cross-section of a portion of the machine and a tube at the point of welding, with the center compressing rolls partly broken away. Fig. 7 is an enlarged view of a portion of the machine frame and a tube being welded broken away to show the tube seam-opening and centering member. Fig. 8 is a cross-section on the line $y$ $y$ in Fig. 7. Fig. 9 is an enlarged front elevation of the work compressing rolls, an engaged tube, and associated portions of the machine. Fig. 10 is an enlarged plan of an end portion of the machine table with a transformer and portions of the connected current conductors associated therewith. Fig. 11 is a cross-section similar to Fig. 6 with the welding means modified, and Fig. 12 is a front elevation of such modified means and associated parts, with one side beam and associated parts removed.

Referring to the drawings, 1 1 designate transversely spaced parallel beams which are mounted longitudinally of the machine on standards 2. Table plates 3 are mounted on the upper sides of each beam 1 with their inner parallel edges spaced, as at 4, and preferably terminating at their ends short of the ends of the beams as shown in Figs. 1 and 2. Mounted on the tops of the table plates 3 are the longitudinally extending parallel blocks 5 5 which have their inner edges spaced to provide an opening in register with the opening 4 of the table and are transversely adjustable on the table due to the threading of adjusting screws 6 in their outer sides and the anchoring of such screws for rotary movements in flanges 7 rising from the outer edges of the table plates 3, as best shown in Fig. 6.

8 8 designate laterally spaced parallel conductor bars, which are mounted on the inner edges of the blocks 5 and have their inner edges provided with the upwardly extending welding dies 9, which may comprise separate pieces, if desired, as shown. The ends of the conductor bars 8 preferably extend beyond the table blocks 5 and connect by separate leads 10 to the respective sides of the secondary of an associated transformer 11, one of which is mounted upon the beams 1 1 at each end thereof, (see Figs. 1, 2, 3 and 10).

The standards 2 have extensions or uprights 12 rising therefrom to the rear of the beams 1, which extensions form seats 13 at their uppper ends for a hollow beam 14. This beam extends longitudinally of the machine and has its front side fashioned to form a guide for the horizontal reciprocatory movements of a head 15 over the beams 1 longitudinally thereof. The head 15 has a plunger 16 working vertically through a socket therein and supported in proper vertical adjustment relative thereto by a screw stem 17, which is adjustably suspended from an overhanging boss 18 of the head. The screw stem 17 has its upper end working within a socket 19 carried by the boss 18 and reduced to permit a coiled compression spring 20 within the socket to act thereon to yieldingly retain the stem and its plunger in lowered position. The free end of the reduced portion of the stem 17 works through the upper end of the socket 19 and threads through adjusting nuts 21 which bear upon such socket.

A table 22 is secured to the lower end of the plunger 16 and in the present instance has spindles (not shown) projecting downwardly therefrom and carrying a central set of opposed work compressing rolls 23 and two end sets of opposed work compressing rolls 24, which are disposed on opposite sides of the set of rolls 23 in position to coöperate with the rolls 23 to compress a tube or other piece of rolled work A to close the seam thereof. Rolls are preferably used for this purpose to reduce to a minimum the friction caused by moving the compressing means along the work. A length of work A, when held by the compression rolls 23, 24, is disposed centrally over the welding dies 9 of the conductors 8 longitudinally thereof with its seam in register with the opening between such dies. In order that the work may have contact with the welding flanges 9 only at the point of weld so as to localize the current at such point, the center set of rolls 23 is lowered slightly relative to the rolls 24 to cause the work, as the rolls move along the same, to be progressively bowed to a slight degree to have contact with the welding flanges only at a point intermediate the center compressing rolls 23, the remaining portion of the work being held free from contact with the conductors by the rolls 24, as best illustrated in Fig. 9, or in any other suitable manner. It is found in practice that a thirty-second of an inch drop of the rolls 23 below the rolls 24 imparts a sufficient bow to the work to cause it to have contact with the welding flanges 9 of the conductors only at a point intermediate the rolls 23.

The work A, which may be of any length proportionate to the size of the machine, is held at its ends by thrust bars 25 which seat at their inner ends against the respective ends of the work and have their outer ends adjustably working through gage-blocks or holders 26, being secured in adjusted position therein by set screws 27, or in any other suitable manner. The blocks 26 comprise arms which are hinged, as at 28, to the outer side of the front beam 1 and project over the space between the beams in position to place the bars 25 in longitudinal register with the work when gripped between the rolls 23 and 24.

The head 15 and attached work compressing means are moved longitudinally of the beam 14 and work A by the provision of a screw shaft 29 longitudinally within the beam 14, which shaft threads through an arm 30 projecting rearwardly from the head 15 through a registering slot 31 in said beam. The shaft 29 has two oppositely beveled gears 32 loosely mounted thereon within a yoke 33, secured to one of the end standards 12, and meshing with a companion gear 34 on a vertical shaft 35, which is journaled in the yoke 33, and in a lower bearing arm 36 projecting from the outer side of the associated standard. Beveled gears 37 connect the shaft 35 to a shaft 38, which in turn is shown as being driven from a motor 39 through the medium of a belt 40, which connects the drive pulley of the motor to a pulley 41 on the shaft 38.

A clutch-sleeve 42 is feathered to the shaft 29 intermediate the gears 32 thereon and is adapted, by a movement of the shift arm 43 in engagement therewith, to be shifted in one direction or the other upon said shaft to place such clutch-sleeve into engagement with a coöperating clutch surface on the inner end of either gear 32, whereby to drive such shaft in either direction from a rotation of the gear 34 in one direction. A clutch shifting rod 44 projects from the clutch shifting arm 43 through the frame beam 14 to the rear of the screw shaft 29 parallel therewith, being mounted in the ends of such beam. This rod has collars or buttons 45 adjustably mounted thereon adjacent its ends with which the rear end of the arm 30 of the head coacts at predetermined points in its movement to effect a movement of such rod to automatically throw the clutch sleeve 42 to neutral position relative to the gears 32. It will be noted in Fig. 5 that the arm 30 has its rear end forked to adapt it to straddle the rod 44. The end of the rod 44 opposed to the shift arm 43 projects without the associated end of the beam 14 and has a peripherally grooved collar 46 thereon with which the forked end of a shift lever 47 engages (see Figs. 1 and 4.) This shift lever is fulcrumed to the frame arm 48 and extends down under the table beams 1 1 and thence upwardly and attaches to the associated end of a hand-shifting rod 49 which is disposed in advance of the beams 1, being substantially the length of such beams and rests for free reciprocatory movements on rolls 50 carried by the front beam 1. It is thus apparent that the rod 49 may be shifted by hand to effect a manual release or engagement of the clutch 42 relative to either gear 32 to permit a stopping of the machine at any point in the operation thereof, and also that if the head 14 is permitted to travel to the limit of its intended stroke, the arm 30 thereon will coact with the adjacent button 45 and effect a movement of the rod 44 to shift the clutch member and automatically stop the movement of the head.

Extending between the table beams 1 1 and journaled in the end members 51, which close the openings between the ends of said beams, is a screw shaft 52 upon which blocks or heads 53 are threaded. The blocks 53 are shown as having races in their sides below their axes in which the guide ribs 54 on the inner lower edges of the beams 1 work to assist in guiding the movements of such blocks and preventing a turning thereof on the shaft 52. Pivoted to the upper side of each block 53, as at 55, and rising therefrom is a spacing blade 56 the upper end of which is adapted to project upwardly through the table opening 4, between the conductors 8 and within the seam opening a of the work to prevent a closing of the seam at such point. The blocks 53, 53 are so located that a blade 56 thereof is adapted to project within a seam of a tube A without each set of compressing rolls 24 in contiguous relation thereto, as shown in Fig. 1, thus serving to prevent a complete closing of the seam until the work passes between the center compressing rolls 23. The blades 56 also serve to center the work seam with the space between the welding dies 9, as is apparent. To prevent short circuiting of the welding current through the blade 56, the same is of laminated structure with an inner sheet of insulation, as shown at 57. The blades 56 have arms 58 projecting preferably inwardly or toward each other from their pivotal points to permit a rocking of the blades in one direction only, each blade being normally held against rocking movements by a contraction spring 59, which is anchored at its ends to pins 60 projecting from the block and the angled end of the associated blade, as shown in Figs. 7 and 8. During a welding operation only the blade 56 which is in advance of the compressing rolls projects within the seam a of the work, as the seam at the rear of the rolls is closed by the welding process, thus causing the rear blade to be rocked against the tension of its spring, due to the edge of such blade traveling along the under side of the tube or work in contact therewith. The two blocks 53 and their blades 56 are provided to permit a tube to be welded in either direction of movement of the head 15. To facilitate a relative adjustment of the blocks 53 on the screw shaft 52, such screw, instead of threading directly through the blocks 53, threads through bushing members 61 which are held within the lower forked portions of the blocks by contracting such split block ends by screws 62. With this construction, to relatively adjust the blocks, it is only necessary to remove the blocks from the bushings 61, then turn such bushings to the desired position on the shaft, after which the blocks may be again secured in position thereon, as is apparent. A sprocket chain 63 communicates rotation from a sprocket wheel 64 on the screw shaft 29 to a sprocket wheel 65 on the screw shaft 52, such sprocket wheels being properly proportioned to drive the blocks 53 at a speed equal to the speed of travel of the head 15.

Insulation is employed wherever necessary to insulate the parts, as between standards 2 and the uprights 12 thereof, as at 66; the beams 1 and end pieces 51 thereof, as at 67, Figs. 3 and 4; the spacing blades 56 and holding parts, as at 68, Fig. 8, and the guide ribs 54 and beams 1, as at 69, Fig. 8.

The primary coils of the transformer 11 are connected in a suitable circuit 70 having a switch 71 therein, which switch, for convenience, is carried by the head 15. The wires leading to and from the switch are looped over supporting sheaves 72 and are of sufficient length to allow for the movements of the head 16.

In the operation of the machine, a tube or other similar piece of work A to be seam welded is gripped at its ends between the thrust bars 25, the switch 71 is then closed to cause electric welding currents to flow through the secondaries of the transformer 11, leads 10 and conductor bars 8 when the work is brought in contact with the dies 9 of such bars to close the welding circuits. The operator then moves the hand rod 49 to throw the clutch member 42 into engagement with the proper gear 32 to effect a movement of the head 15 and the rolls 23 and 24 carried thereby along the work, and also to effect a driving of the screw shaft 52 to move the spacing-blade blocks 53 uniformly with the head. As the rolls 23 and 24 travel along the tube A, the center set of rolls 23 compresses the tube to close the seam a thereof and, due to their being slightly lowered from the plane of the sets of rolls 24, coöperate therewith to effect a progressive bowing of the tube, as indicated in Fig. 9, whereby the tube will have contact with the welding dies 9 of the conductors 8 only at the point of bite of the rolls 23 so that the welding occurs only at such point. The rolls 24 in addition to holding the work from contact with the conductors 9, except at the point of bite of the rolls 23, also act to partly close the work seam. The seam, however, is prevented from complete closing in advance of the forward set of rolls 24 by the forward blade 56 working within the tube seam. When the rolls have traveled the entire length of the tube or piece of work A and move from engagement therewith, the arm 30 on the head 15 moves into contact with a button 45 on the shift rod 44 to effect a movement of such rod to automatically shift the clutch member 42 to neutral position, thus stopping the operation of the machine. The welded work is then removed and another piece of work to be welded inserted in its place. The operator then moves the hand shift rod 49 in a direction to throw the clutch member 42 into engagement with the gear 32 which was not previously engaged, thus causing the screw shafts 29 and 52 to rotate in proper directions to move the respective parts carried thereby to the opposite end of the machine to effect a welding of the work in the same manner as previously described. As the resistance of the conductor is proportional to its length, it is important in the practical operation of a machine of this class to provide a transformer at each end of the conductors 8, thus causing the welding current to be equal throughout the length of the conductors.

In the modification shown in Figs. 11 and 12, 73, 73 designate the table-plates which are mounted on the spaced beams 74, 74, and have the blocks 75, 75 mounted for transverse adjustment thereon, as described for the blocks 5 of the form above described. 76, 76 designate the conductor bars which are mounted on and overhang the inner edges of the blocks 75, 75 and are provided on their inner edges with the welding dies 77, 77. The bars 76 and their dies are of a flexible nature, and are yieldingly held to the blocks 75 by the coöperating action of screws 78 and encircling compression springs 79. 80 designates the head, which is movable over the welding-dies 77, 77 and work A longitudinally thereof, and carries one or more sets of work compressing rolls 81, one of which sets acts on the work at the welding point. Mounted on the screw 82 which is disposed longitudinally between the beams 74, 74 and which is the screw described in the preferred form for carrying the spacing finger blocks 53, is a block 83 which has its upper end forked and carrying a roll 84, as shown. This roll has its periphery bearing upwardly against the under sides of the conductor bars 76 and welding dies 77 and preferably has a peripheral bead 85 for working in the space between the welding dies. The block 83 is adapted to travel at the same speed as the head 80 and in a direction therewith, and is disposed to act on the conductor bars and dies to bow them upwardly and cause them to have contact with the work at a point intermediate the bite of the rolls 81, whereby to effect a welding of the work seam at such point. As the roll 84 travels along the conductors 76 and their welding dies, the bow of such conductors and dies changes accordingly so that there will be a progressive changing of the point of welding contact between the dies and the work longitudinally thereof. The roll 84 is shown as being mounted in bearing blocks 86 which are held in adjusted position relative to the fork of the block 83 by adjusting screws 87. The block 83 is mounted on the screw 82 and guided for movements between the beams 74 in a manner similar to that of the blocks 52 carrying the seam spacing fingers 56.

It is apparent that I have provided a welding machine for welding long pieces of work throughout their lengths, and which is adapted to cause the work to have contact with a long conductor only at the point of weld, which point gradually changes as the movable work coacting parts move lengthwise along the same, by reason of the work coacting rolls bowing the work as it moves therealong or the welding die coacting roll 84 bowing the dies to cause them to have gradual changing contact with the work lengthwise thereof during a welding operation.

I wish it understood that my invention is not limited to any specific construction or arrangement of the parts except in so far as such limitations are specified in the claims.

Having thus described my invention, what I claim as new and desire to secure by Letters Patent, is,—

1. In an electric welding apparatus, the combination of elongated welding dies, means for holding work stationary adjacent such dies but free from contact therewith, and mechanism capable of movement longitudinally of the dies and work and operative to cause the dies and work to have relative lateral movements to progressively change the point of welding contact of the dies with the work longitudinally thereof.

2. In an electric welding apparatus, the combination of bar welding dies, means for holding work adjacent to said dies longitudinally thereof, and mechanism movable longitudinally of the dies and work and operative to effect relative lateral movements of the work and dies to progressively change the point of welding contact of the dies with the work longitudinally thereof.

3. In an apparatus of the class described, the combination of a set of elongated welding dies, means for holding an elongated piece of work to be seam-welded adjacent such dies longitudinally thereof and normally spaced therefrom, means operative to effect relative lateral movements of the work and dies to cause them to have a gradually changing welding contact longitudinally of the work, and means for preventing a closing of the work seam in advance of the welding point.

4. In an electric welding apparatus, the combination of stationary electrical conductors, and mechanism which is capable of movement along a piece of work to progressively change its point of welding contact with the conductors.

5. In an apparatus of the class described, the combination of a set of elongated conductors, means for holding work fixed against endwise movements relative to the conductors, and mechanism operative to act on the work longitudinally thereof to progressively change its point of welding contact with the conductors.

6. In an apparatus of the class described, the combination of a set of substantially parallel bar conductors, of mechanism for acting on longitudinally seamed work to close the seam and cause the work to have a gradually changing point of contact along its seam with the conductors to weld such seam for at least a portion of its length.

7. In an apparatus of the class described, the combination of a set of parallel bar conductors, and mechanism movable longitudinally of such conductors and of a piece of work to cause a gradually changing bowing of the work longitudinally thereof to progressively change the point of welding contact of the work with the conductors.

8. In an apparatus of the class described, the combination of a set of spaced bar conductors, a work gripping mechanism, said mechanism being capable of relative movements longitudinally of the work, and the mechanism being capable of acting on the work to gradually change its point of welding contact with the conductors to progressively weld the work throughout a predetermined portion of its length.

9. In an apparatus of the class described, the combination of a set of laterally spaced elongated electrical conductors, means for holding work adjacent to and fixed against movement longitudinally of the conductors, and mechanism operative to act on the work to cause it to have a gradually changing point of contact with the conductors to longitudinally seam weld the work.

10. In an apparatus of the class described, the combination of a set of bar conductors, means for holding work substantially parallel to and fixed against movement longitudinally of the conductors, and work coacting mechanism, said conductors and mechanism being capable of relative movements, to cause said mechanism to act on the work to effect its gradually changing welding contact lengthwise thereof with the conductors.

11. In an apparatus of the class described, the combination of a set of laterally spaced conductor bars, a roll carrying part, said conductors and part being capable of relative movements, means for fixing work against longitudinal movement relative to the conductors, and rolls carried by said part and adapted to act on the work to cause it to have a gradually changing contact lengthwise thereof with the conductors when said conductors and part have relative movements.

12. In an apparatus for seam welding tubes or other long work, the combination of a set of laterally spaced elongated conductors, means for holding work adjacent to one side of such conductors, and mechanism operative to cause a part thereof to travel along the work longitudinally of the conductors and to act on the work to cause it to have a gradually changing point of welding contact lengthwise thereof with the conductors.

13. In an apparatus for seam welding long pieces of work, the combination of a pair of laterally spaced substantially parallel conductors, means for holding work adjacent to such conductors in substantial parallelism therewith, and mechanism having rolls which are operative to travel longitudinally of the work and to cause the work to have welding contact with the conductors, the point of contact changing lengthwise of the work as the rolls travel along the same.

14. In a machine of the class described, the combination of a set of laterally spaced substantially parallel conductors of a length at least equal to the length of a seam to be welded, means for holding work at one side of such conductors in substantial parallelism therewith, a head, means operative to effect a movement of such head longitudinally of the conductors, and work engaging parts carried by the head and operative to effect a flexing of the work to cause it to have a gradually changing point of welding contact lengthwise thereof with the conductors as the head moves along the work.

15. In an apparatus of the class described, a set of laterally spaced substantially parallel conductors, means holding work adjacent to the conductors longitudinally thereof, means movable longitudinally of the work and having contact therewith to cause it to have a gradually changing point of welding contact with the conductors as it moves along the work, and screw means operative to effect a movement of said work coacting means longitudinally of the work.

16. In an apparatus of the class described, a set of laterally spaced bar conductors, means for preventing endwise movements of work longitudinally of the conductors, mechanism operative to cause a part thereof to move longitudinally of the work to gradually change its point of welding contact with the conductors, and means operative at a predetermined point in the movement of such mechanism to effect an automatic stopping of such part.

17. In an apparatus of the class described, the combination of a set of laterally spaced bar conductors, means holding work to be seam welded adjacent to such conductors lengthwise thereof, a part movable longitudinally of the work, a plurality of sets of rolls carried by such part and acting on the work to bow it as it moves therealong to cause the work to have a gradually changing point of welding contact lengthwise thereof with the conductors, screw means for moving said part longitudinally of the work, and means which is both manually and automatically operative to effect a stopping of the movement of such part.

18. In an apparatus of the class described, the combination of a set of laterally spaced conductors, means for holding work stationary adjacent to such conductors, mechanism operative to cause a gradually changing point of welding contact lengthwise thereof with the conductors, and movable means for preventing a closing of the work seam in advance of the welding point.

19. In a seam welding apparatus, a set of laterally spaced conductor bars, means reciprocally movable longitudinally of such bars to act on work lengthwise thereof to cause it to have a gradually changing point of welding contact with the conductors, reciprocally movable means having a part working within the work seam to hold the seam in register with the space between the conductor bars, and mechanism operative to control the movements of said two reciprocatory means.

20. In an apparatus of the class described, a set of laterally spaced conductor bars, means reciprocally movable longitudinally of the conductor bars to act on work lengthwise thereof to cause it to have a gradually changing point of welding contact with the conductors, a member movable longitudinally of such bars, a blade pivotally projecting from said member and adapted to project within the work seam to prevent a closing thereof in advance of the point of welding contact in one direction of movement of said reciprocatory means, and mechanism operative to move said reciprocatory means and member in unison.

21. In an apparatus of the class described, the combination of a set of longitudinally spaced conductor bars, means for holding work to be seam welded in adjacent parallelism with such bars, a head reciprocally movable longitudinally of said bars, a plurality of work coacting parts adjustably carried by said head and adapted to act on the work to close its seam and cause it to have a gradually changing point of welding contact with the conductors, means operative to prevent a closing of the seam in advance of the welding point in one direction of movement of the head, and mechanism operative to cause said head and seam opening means to move in unison longitudinally of the conductors.

22. In an apparatus of the class described, a table, a set of laterally spaced conductor bars mounted on such table, means for holding work to be seam welded in substantial parallelism with the conductors, mechanism operative to act on work to cause it to have a gradually changing point of welding contact lengthwise thereof with the conductors, and mechanism having a seam spacing part for working between the conductors and into the work seam to prevent a closing of the work seam in advance of the welding point and to center the seam with the conductor bars.

23. In an apparatus of the class described, a set of laterally spaced conductor bars, means for holding work adjacent to such bars longitudinally thereof, means movable longitudinally of said bars, a plurality of sets of rolls carried by said means for acting on the work longitudinally thereof to close its seam, a portion of such rolls being offset from the plane of the others to effect a crimping of the work to cause it to have a gradually changing point of welding contact with the conductor bars as the rolls move longitudinally thereof, and mechanism for controlling and moving said roll carrying means.

24. In an apparatus of the class described, a table, laterally spaced conductor bars carried by such table, means for holding work to be seam welded adjacent to such bars, a guide part parallel to such bars, a head guided by such parts for reciprocatory movements, means carried by such head for acting on work longitudinally thereof to cause it to have a gradually changing point of contact with the conductor bars, and mechanism for moving and controlling the movements of the head along said guide part.

25. In an apparatus of the class described, the combination of a table, a set of laterally spaced conductor bars carried by the table, a guide part parallel to said guide bars, means for preventing endwise movements of work relative to the conductor bars, means guided for reciprocatory movements by said guide part and having parts capable of acting on work to effect a closing of the seam to be welded at the welding point, and to cause the work to have a gradually changing point of welding contact longitudinally thereof with the conductor bars as the reciprocatory means is moved, mechanism for moving such reciprocatory means, and movable means for working in the work seam to center it with the conductor bars.

In testimony whereof, I have hereunto signed my name to this specification in the presence of two subscribing witnesses.

ALVIN E. BUCHENBERG.

Witnesses:
C. W. OWEN,
M. G. GASKELL.